United States Patent [19]

Lambertus

[11] 4,072,459
[45] Feb. 7, 1978

[54] NOZZLE FOR A GRANULATING DEVICE FOR GRANULATING SYNTHETIC PLASTICS MATERIAL

[75] Inventor: Friedrich Lambertus, Stuttgart, Germany

[73] Assignee: Werner & Pfleiderer, Stuttgart, Germany

[21] Appl. No.: 676,219

[22] Filed: Apr. 12, 1976

[30] Foreign Application Priority Data

Apr. 19, 1975   Germany .............................. 2517402

[51] Int. Cl.² .............................................. B29F 3/04
[52] U.S. Cl. .................................. 425/464; 425/382.2
[58] Field of Search ............... 425/461, 463, 464, 382, 425/382.2, 192, 376; 264/176 F; 72/253, 264, 268

[56] References Cited

U.S. PATENT DOCUMENTS

| | | | |
|---|---|---|---|
| 2,403,476 | 7/1946 | Berry et al. | 425/464 |
| 3,114,169 | 12/1963 | Palmer et al. | 425/464 |
| 3,599,286 | 8/1971 | Karet | 425/464 |
| 3,867,082 | 2/1975 | Lambertus | 425/464 X |

*Primary Examiner*—Francis S. Husar
*Assistant Examiner*—Mark Rosenbaum
*Attorney, Agent, or Firm*—Hane, Roberts, Spiecens & Cohen

[57] ABSTRACT

The present invention relates to a nozzle, especially to a nozzle in the form of a perforated plate, for granulating synthetic plastics material, and more particularly for granulating in water.

7 Claims, 1 Drawing Figure

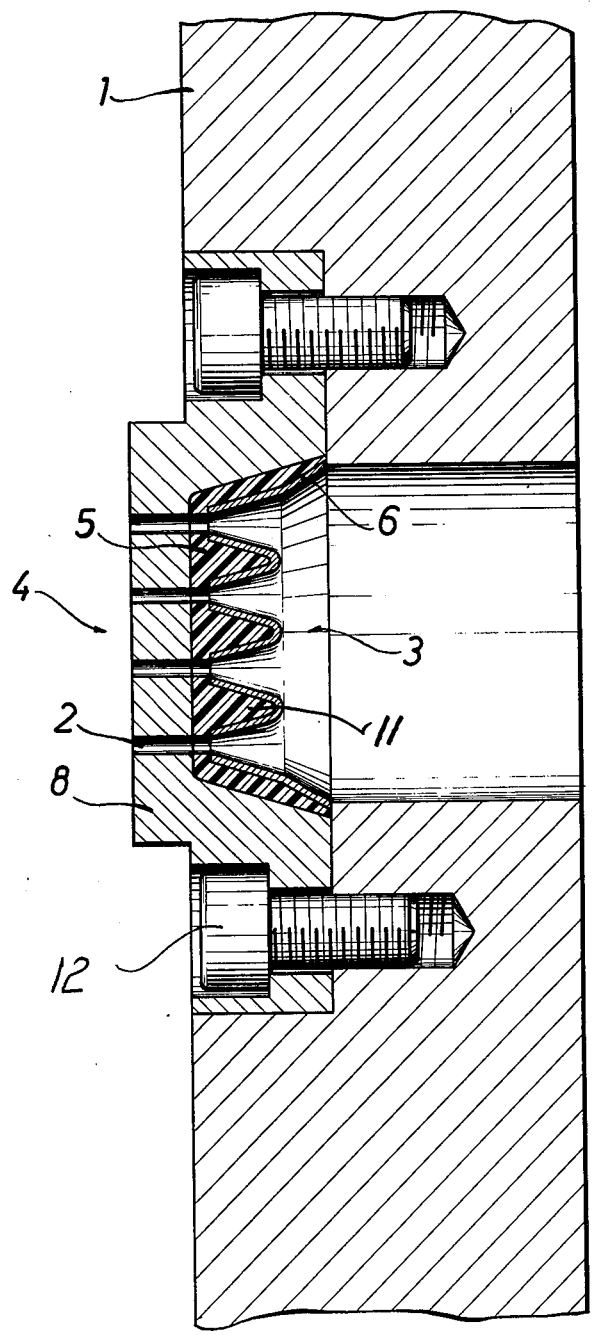

NOZZLE FOR A GRANULATING DEVICE FOR GRANULATING SYNTHETIC PLASTICS MATERIAL

BACKGROUND

There are known granulating devices of the general type above referred to in which granulation is effected by cooling the outlet side of the nozzle and providing cutting knives sweeping over the cooled nozzle side. Nozzles used for this type of granulation have several bores extending in axial alignment with the flow of the material to be granulated. There is also provided between the inlet and the outlet areas of the nozzles bores a radially extended insulation layer. The nozzle bores also have in their lengthwise direction a heat insulation in the form of a coherent insulation material of low heat conductivity filling a gap extending about at least several nozzle bores on the inlet side thereof. This filled gap extends radially within the range of the outlet side of the nozzle bores. Granulating devices of this type are shown in applicant's prior U.S. Pat. No. 3,867,082, issued Feb. 18, 1975.

THE INVENTION

It is a broad object of the invention to obtain an equalization of the temperature gradients, especially between the inner and the outer ends of the nozzle bores. Such equalization of the temperatures at the bores results in a marked increase of smooth and continuous operation of the device and also improves the uniformity of the quality of the produced granulate.

The afore-mentioned broad object and other objects, features and advantages which will be pointed out hereinafter, are obtained by providing a continuous insulation layer encompassing all nozzle bores. The obtained temperature equalization as is developed within the working range at a selected outflow velocity of the granulated material affects markedly and favorably the properties of the granulated plastics material emerging from the nozzle bores in the form of strands.

At the present high demands made on the qualities of the produced granulate, it is essential that the strands of the plastics material to be granulated as they emerge from the nozzle bores are nearly solid but still capable of being granulated by the sweeping cutting knives. In other words, the strands of material when emerging from the bores must still have a residual plasticity, but a higher plasticity while still within the bores.

There are several types of synthetic plastics material such as polyester and polyimid which have a high melting point and a narrow temperature range between the solid and the liquid phase, and as a result maintenance of optimal temperature conditions in the nozzle is particularly difficult but also particularly important.

During variations of the output as automatically and unavoidably occur with the filter chambers in a filter chamber exchanging device, there is often the danger that the mass of plastics material in the nozzle bores hardens unless special means preventing such rigidification are used, such as additional means for heating the nozzle.

It is a further object of the invention to prevent such rigidifying of material in the bores of the nozzle even for plastics material which rigidify even at minor temperature variations.

This object of the invention is obtained by arranging the afore-referred to gap to encompass each or at least most of the nozzle bores and is limited by a layer constituting the inlet portion of the bores. Such protection and formation of the bores at the inlet side thereof also improves the heat retention at the individual bores of the nozzle.

Moreover, this arrangement permits a convenient and simple replacement as a unit parts of the bore aggregates which are particularly sensitive to heat loads and corrosion.

Further objects, features and advantages of the invention will be pointed out hereinafter and set forth in the appended claims.

DESCRIPTION OF THE DRAWING

In the single FIGURE of the accompanying drawing, a preferred embodiment of the invention is shown by way of illustration and not by way of limitation.

The FIGURE shows a sectional view of a nozzle in the form of a perforated plate according to the invention for use in a granulating device for granulating synthetic plastics materials.

Referring now to the FIGURE in detail, only the portions of the granulating device are shown which are essential for the understanding of the invention, and more particularly, the nozzle. A granulating device of the type for which the nozzle according to the invention is intended, is described in detail in aforementioned applicant's prior U.S. Pat. No. 3,867,082.

The nozzle comprises a plate 1 including a plurality of crosswise and axially parallel bores 2. The material to be granulated is pressed through the bores in the manner also described and illustrated in applicant's prior patent, the inlet side of the nozzle being the right-hand side thereof. The material to be granulated emerges from the left-hand side, that is, the outlet side 4 in the form of strands. The part of the nozzle including bores 2 is preferably in the form of an insert 8 which is secured to the body of the nozzle by suitable means such as screw bolts 12.

As will be more fully explained hereinafter, the bores have on the inlet side a larger cross-sectional area than on the outlet side.

There is provided between a space 3 on the inlet side of insert 8 and the outlet side 4, a gap 5. This gap is filled with a suitable heat-retaining insulation material 11 which serves to reduce significantly the loss of heat at the outer surface on the outlet side 4 of the nozzle. The insulation 11 filling gap 5 encompasses at least a plurality of bores lengthwise thereof and in a manner such that the heat loss on the inlet side is reduced to a significant extent.

As it is apparent from the FIGURE, the insulation material filling gap 5 jackets each individual bore in its lengthwise direction. The separation of the insulation material from the influx of the plastics material is effected by a coating or layer 6. This layer is adapted to the specific properties of the plastics material to be granulated. It can also be used to reduce the wear and tear of the insulation material.

The afore-described arrangement has also the advantage that the entire bore assembly can be conveniently arranged as an insulation body which can be inserted as a unit and also removed as a unit, said unit essentially consisting of the insulation material filling gap 5 and the protective layer 6. The layer may be metalized, for instance chrome may be used, or a ceramic material may be used. As it is now apparent, the insulation material filling gap 5 and the layer 6 covering the same, extend in effect the length of the bores and give the same a widened inlet opening at the inlet end than at the outlet end due to the conical shape of this extension.

The insulation material 11 and its metalized layer 6 may be held in position by clamping the insulation material and the covering layer between the body of nozzle 1 and insert 8 as it is clearly shown in the FIGURE.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. In a device for granulating synthetic plastics material while in flowable consistency comprising a nozzle including a plate having a plurality of bores cylindrical along their length and a recess leading to said bores, said nozzle plate having an inlet side and an outlet side, the improvement comprising insulation material on the inlet side of the nozzle plate adjacent thereto and extending over at least several of said bores for reducing heat loss as the material to be granulated is passing through said bores, said insulation material comprising a plurality of protrusions extending from the inlet side of the nozzle plate in axial direction into said recess, said protrusions tapering in narrowing fashion away from said inlet side and being rounded such that adjcent protrusions define therebetween a generally funnel-shaped extension of the respective nozzle bore thereby elongating the effective length of the bores, said nozzle having a space for receiving material to be fed to said bores, said space opening into said recess and being common to said funnel-shaped extensions and in direct communication therewith such that the funnel-shaped extensions divide the flow of material to be granulated into several partial streams, and form-retaining coating means covering said insulation material at least on the areas defining said protrusions.

2. The granulating device according to claim 1 wherein said nozzle plate is releasably insertable into the nozzle, said plate including said bores and having attached thereto on the inlet side of the bores said shaped insulation material.

3. The granulating device according to claim 1 wherein said coating means comprise a metalized layer.

4. The granulating device according to claim 3 wherein said metalized layer is a layer of chrome.

5. The granulating device according to claim 1 wherein said coating means is a layer of ceramic.

6. The granulating device according to claim 1 wherein said insulation material consists of polyimid.

7. The granulating device according to claim 1 wherein said recess in said plate is conical.

* * * * *